United States Patent [19]

Morikawa

[11] Patent Number: 5,898,829
[45] Date of Patent: *Apr, 27, 1999

[54] FAULT-TOLERANT COMPUTER SYSTEM CAPABLE OF PREVENTING ACQUISITION OF AN INPUT/OUTPUT INFORMATION PATH BY A PROCESSOR IN WHICH A FAILURE OCCURS

[75] Inventor: Takahiro Morikawa, Tokyo, Japan

[73] Assignee: NEC Corporation, Tokyo, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/757,564

[22] Filed: Nov. 27, 1996

Related U.S. Application Data

[63] Continuation of application No. 08/408,302, Mar. 22, 1995, Pat. No. 5,630,053.

[30] Foreign Application Priority Data

Mar. 22, 1994 [JP] Japan .................................. 6-049619

[51] Int. Cl.[6] .................................................. G06F 11/00
[52] U.S. Cl. .............................. 395/184.01; 395/182.09; 395/185.01
[58] Field of Search ........................ 395/184.01, 182.08, 395/182.09, 185.07, 185.08, 182.02, 182.1, 200.38, 200.54, 185.01, 182.11

[56] References Cited

U.S. PATENT DOCUMENTS 4,799,159  1/1989  Davidson et al. .................. 395/184.01
5,088,021  2/1992  McLaughlin et al. ............. 395/182.09
5,136,595  8/1992  Kimura ............................... 395/184.01
5,155,729  10/1992 Rysko et al. ....................... 395/182.09
5,202,822  4/1993  McLaughlin et al. .................. 364/187
5,274,797  12/1993 Barlow et al. ...................... 395/184.01
5,418,937  5/1995  Inoue ................................. 395/184.01
5,422,932  6/1995  Major et al. ............................ 395/489
5,432,715  7/1995  Shigematsu et al. .............. 395/184.01
5,630,053  5/1997  Morikawa .......................... 395/184.01

OTHER PUBLICATIONS

Gray et al., "Fault Tolerant System", McGraw–Hill, Inc., (Oct., 1986).
Yoshihiro Tohma et al., "Structure And Design Of Fault-Tolerant System", pp. 159–160, (Mar. 1991).

Primary Examiner—Joseph E. Palys
Attorney, Agent, or Firm—Foley & Lardner

[57] ABSTRACT

In a computer system comprising first through N-th processors which are provided with first through N-th processor input/output information transmission paths, respectively, an n-th processor is connected to an (n–1)-th processor, an (n–2)-th processor, an (n+1)-th processor, and an (n+2)-th processor, where n represents each of 1 through N, both inclusive. Coupled to the first through the N-th processor input/output information transmission paths and to a system input/output information transmission path for a controlled system, an input/output information path control device connects the system input/output information transmission path to one of the first through the N-th processor input/output information transmission paths. The n-th processor comprises an n-th central processing unit (CPU) for managing the whole of the (n–1)-th processor, an n-th failure detecting circuit for always monitoring an operation state in the (n–1)-th processor, and an n-th input/output information transmission path acquisition control circuit for directing control operation for the input/output information transmission path control device.

7 Claims, 7 Drawing Sheets

FAULT-TOLERANT COMPUTER SYSTEM CAPABLE OF PREVENTING ACQUISITION OF AN INPUT/OUTPUT INFORMATION PATH BY A PROCESSOR IN WHICH A FAILURE OCCURS

This application is a continuation of application Ser. No. 08/408,302, filed Mar. 22, 1995, now U.S. Pat. No. 5,630,053.

BACKGROUND OF THE INVENTION

This invention relates to a computer system comprising a plurality of processors arid, in particular, to a fault-tolerant computer system comprising an active processor and a backup processor wherein the active processor carries out control for a controlled system when a failure does not occur in the active processor and the backup processor carries out control for the controlled system when a failure occurs in the active processor.

Such a fault-tolerant computer system is, for example, described by J. Gray et al and translated by E. Watanabe et al into Japanese in a book published by McGraw-Hill, Inc., (October, 1986) and entitled "FAULT TOLERANT SYSTEM." The fault-tolerant computer system comprises a first processor acting as an active processor, a second processor acting as a backup processor, and an input/output control device serving as a channel connection switching control device. The first processor is connected to the input/output control device via a first input/output channel while the second processor is connected to the input/output control device via a second input/output channel. The input/output control device is connected to a controlled system via a system input/output channel.

The first processor comprises a first central processing unit (CPU) and a first failure detecting circuit. The second processor comprises a second CPU and a second failure detecting circuit. The first CPU periodically produces a first periodic signal indicative of a first operation state of the first CPU. The second CPU periodically produces a second periodic signal indicative of a second operation state of the second CPU.

The first failure detecting circuit always monitors the second operation state of the second CPU by receiving the second periodic signal. The first failure detecting circuit delivers a first monitored result signal indicative of its monitored result. Inasmuch as the first monitored result signal indicates the second operation state of the second CPU, the first monitored result signal is called a second processor operation state signal. When the first CPU supplies a first input/output channel acquisition signal to the input/output control device, the input/output control device connects the first input/output channel with the system input/output channel.

Likewise, the second failure detecting circuit always monitors the first operation state of the first CPU by receiving the first periodic signal. The second failure detecting circuit delivers a second monitored result signal indicative of its monitored result. Inasmuch as the second monitored result signal indicates the first operation state of the first CPU, the second monitored result signal is called a first processor operation state signal. When the second CPU supplies a second input/output channel acquisition signal to the input/output control device, the input/output control device connects the second input/output channel with the system input/output channel.

The input/output control device carries out connection and switching of the first and the second input/output channels and the system input/output channel on the basis of the first and the second input/output channel acquisition signals supplied from the first and the second processors.

Operation of the fault-tolerant computer system will be described. Description will be at first made as regards an operation in a case where no failure occurs in both of the first processor and the second processor.

The first CPU of the first processor periodically sends the first periodic signal indicating that no failure occurs in its own CPU (the first CPU) to the second failure detecting circuit of the second processor. The first failure detecting circuit receives the second periodic signal from the second processor and supplies the first CPU with the first monitored result signal indicating that no failure occurs in the second processor.

Each of the first and the second failure detecting circuits may be composed of general electronic circuit elements. Each of the first and the second failure detecting circuits may be, for instance, a "watchdog timer" which is described in detail by Yoshihiro Tohma et al in a book published by Maki Shoten (March 1991) and entitled "Structure and Design of Fault-Tolerant System," on pages 159–160. In the first failure detecting circuit using the "watchdog timer", the second periodic signal includes a second timer start condition signal and a second timer reset condition signal. Responsive to the second timer start condition signal, the first failure detecting circuit makes a timer operate. If the first failure detecting circuit cannot receive the second timer reset condition signal before the timer expires, the first failure detecting circuit judges that a failure occurs in the second processor.

In order to require connection of the first input/output channel and the system input/output channel, the first CPU supplies the input/output control device with the first input/output channel acquisition signal.

When the input/output control device receives the first input/output channel acquisition signal from the first CPU, the input/output control device connects the system input/output channel with the first input/output channel. Such an input/output control device is disclosed in the above-mentioned book entitled "FAULT TOLERANT SYSTEM," on pages 104–106. In this event, the input/output control device accommodates the first and the second input/output channels and the system input/output channel. On reception of the first or the second input/output channel acquisition signals, the input/output control device connects the system input/output channel with one of the first and the second input/output channels for the processor which produces the input/output channel acquisition signal in question.

The second processor is similar in structure to the above-mentioned first processor. When the second CPU recognizes that no failure occurs in the first processor by receiving the first periodic signal supplied from the first CPU, the second CPU makes the second processor operate as the backup processor. For this purpose, the second CPU does not supply the input/output control device with the second input/output channel acquisition signal, thereby the second processor does not use the system input/output channel.

As apparent from the above-mentioned operation, the first processor acquires the system input/output channel to carry out control of the controlled system. The second processor waits as the backup processor.

Description will be made as regards operation in a case where a failure occurs in the first processor which is operable as the active processor.

When the failure due to abnormality in software and fault in hardware occurs in the first processor, the first CPU stops delivery of the first periodic signal to the second failure detecting circuit of the second processor. In this event, the second failure detecting circuit recognizes that a failure occurs in the first processor and the second failure detecting circuit supplies the second CPU with the second monitored result signal indicating that a failure occurs in the first processor.

On reception of the second monitored result signal, the second CPU supplies the input/output control device with the second input/output channel acquisition signal to switch control of the controlled system from the first processor to the second processor. The input/output control device disconnects the system input/output channel from the first input/output channel and connects the system input/output channel with the second input/output channel. Connected to the controlled system, the second CPU carries out transmission and reception of control information to the controlled system by using the system input/output channel.

As apparent from the above-mentioned operation, when switching of the processors is carried out, the second processor acting as the backup processor carries out control of the controlled system instead of the first processor serving as the active processor.

As described above, in a conventional fault-tolerant computer system, the CPU, which detects the failure in its mating processor, produces the input/output channel acquisition signal to be operable as the active processor. However, it is impossible in the conventional fault-tolerant computer system to prevent the CPU where a fault occurs in the processor from supplying the input/output channel acquisition signal to the input/output control device. When the CPU where a failure occurs in the processor accidentally supplies the input/output control device with the input/output channel acquisition signal, the system input/output channel is connected to the processor in which the failure occurs. Under the circumstances, erroneous control information is supplied to the controlled system.

SUMMARY OF THE INVENTION

It is therefore an object of this invention to provide a computer system which is capable of preventing acquisition of an input/output information path by a processor in which a failure occurs.

It is another object of this invention to provide a computer system of the type described, which is capable of preventing erroneous control information from being delivered to the controlled system.

Other objects of this invention will become clear as the description proceeds.

According to this invention, a computer system comprises first through N-th processor which are provided with first through N-th input/output information transmission paths, respectively, where N represents a positive integer which is not less than two. An n-th processor is connected to an (n−1)-th processor, an (n−2)-th processor, an (n+1)-th processor, and an (n+2)-th processor, where n represents each of 1 through N, both inclusive. When n is equal to N, (n+1) turns back to 1. When (n+2) exceeds N, (n+2) turns back to the number obtained by subtracting N from (n+2). When n is equal to 1, (n−1) turns back to N. When (n−2) is less than 1, (n−2) turns back to the number obtained by adding (n−2) and N. Coupled to the first through the N-th input/output information transmission paths and to a system input/output information transmission path for a controlled system, an input/output information path control device connects the system input/output information transmission path to one of the first through the N-th input/output information transmission paths. The n-th processor comprises an n-th central processing unit (CPU) connected to an n-th input/output information transmission path, the (n−1)-th processor, and the (n+1)-th processor for managing the whole of the (n−1)-th processor, an n-th failure detecting circuit connected to the (n−1)-th processor and the (n−2)-th processor for always monitoring an operation state in the (n−1)-th processor, and an n-th input/output information transmission path acquisition control circuit connected to the n-th CPU, the input/output information path control device, the (n+1)-th processor, and the (n+2)-th processor for directing control operation for the input/output information transmission path control device.

DESCRIPTION OF THE PREFERRED EMBODIMENTS

Figure 1:
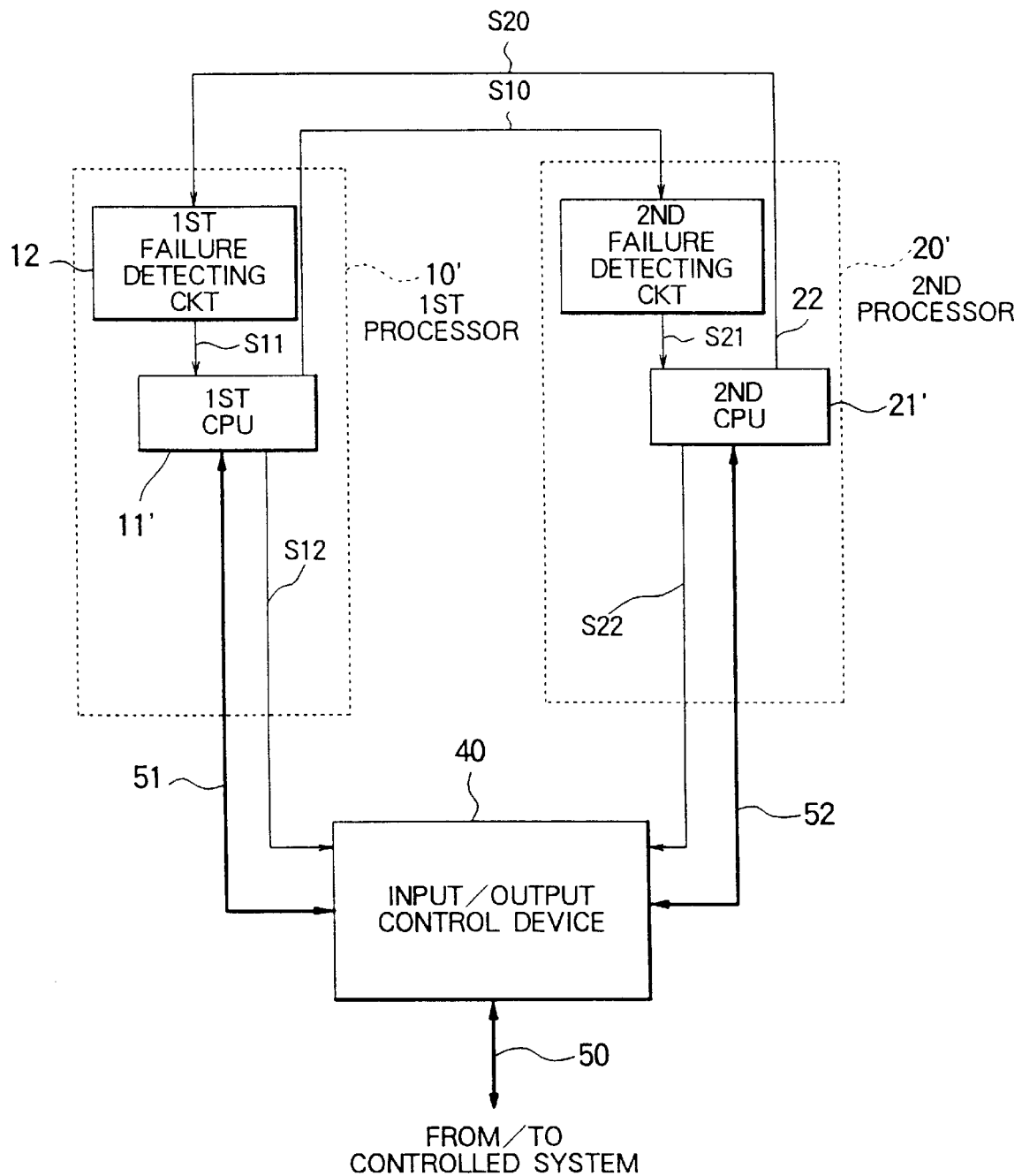
FIG. 1 is a block diagram of a conventional computer system.

Referring to FIG. 1, a conventional computer system will at first be described in order to facilitate an understanding of the present invention. In the example being illustrated, the computer system is a fault-tolerant computer system. The illustrated computer system comprises a first processor 10', a second processor 20', and an input/output control device 40. The first processor 10' is connected to the input/output control device 40 via a first input/output channel 51. The second processor 20' is connected to the input/output control device 40 via a second input/output channel 52. The input/output control device 40 is connected to a controlled system (not shown) via a system input/output channel 50.

The first processor 10' comprises a first central processing unit (CPU) 11' and a first failure detecting circuit 12. The second processor 20' comprises a second central processing unit (CPU) 21' and a second failure detecting circuit 22. The first CPU 11' produces a first periodic signal S10 indicative of an operation state of the first CPU 11. The second CPU 21 produces a second periodic signal S20 indicative of an operation state of the second CPU 21'.

The first failure detecting circuit 12 always monitors the operation state of the second CPU 21 by receiving the second periodic signal S20 indicative of the operation state of the second CPU 21. The first failure detecting circuit 12 delivers a first monitored result signal S11 indicative of its monitored result. When the first CPU 11' supplies a first input/output channel acquisition signal S12 to the input/output control device 40, the first input/output channel 51 is connected to the system input/output channel 50 via the input/output control device 40.

Likewise, the second failure detecting circuit 22 always monitors the operation state of the first CPU 11 by receiving the first periodic signal S10 indicative of the operation state of the first CPU 11. The second failure detecting circuit 22 delivers a second monitored result signal S21 indicative of its monitored result. When the second CPU 21 supplies a second input/output channel acquisition signal S22 to the input/output control device 40, the second input/output channel 52 is connected to the system input/output channel 50 via the input/output control device 40.

The input/output control device 40 carries out connection and switching of the first and the second input/output channels 51 and 52 and the system input/output channel 50 on the basis of the first and the second input/output channel acquisition signals S12 and S22 supplied from the first and the second processors 10' and 20'.

Operation will be described. In FIG. 1, it is assumed that the first processor 10' acts as an active processor and the second processor 20' acts as a backup processor. Description will be at first made as regards an operation in a case where no failure occurs in both of the first processor 10' and the second processor 20'.

The first CPU 11' of the first processor 10' periodically sends the first periodic signal S10 indicating that no failure occurs in its own CPU (the first CPU 11) to the second failure detecting circuit 22 of the second processor 20'. The first failure detecting circuit 12 receives the second periodic signal S20 from the second processor 20' and supplies the first CPU 11' with the first monitored result signal S11 indicating that no failure occurs in the second processor 20'.

The first failure detecting circuit 12 may be composed of general electronic circuit elements. The first failure detecting circuit 12 may be, for instance, a "watchdog timer" which is described in the above-mentioned book entitled "Structure and Design of Fault-Tolerant System" (March 1991), pages 159–160. In the first failure detecting circuit 12 using the "watchdog timer", the second periodic signal S20 includes a second timer start condition signal and a second timer reset condition signal. Responsive to the second timer start condition signal, the first failure detecting circuit 12 makes a timer (not shown) operate. If the first failure detecting circuit 12 cannot receive the second timer reset condition signal before the timer expires, the first failure detecting circuit 12 judges that a failure occurs in the second processor 20'.

In order to require connection of the first input/output channel 51 and the system input/output channel 50, the first CPU 11' supplies the input/output control device 40 with the first input/output channel acquisition signal S12.

When the input/output control device 40 receives the first input/output channel acquisition signal S12 from the first CPU 11', the input/output control device 40 connects the system input/output channel 50 with the first input/output channel 51 for the first processor 10'. The input/output control device 40 is, for example, disclosed in the above-mentioned book entitled "FAULT TOLERANT SYSTEM," pages 104–106. In this event, the input/output control device 40 accommodates the first and the second input/output channels 51 and 52 for the first and the second processors 10' and 20' and the system input/output channel 50 for the controlled system. On reception of the first or the second input/output channel acquisition signals S12 or S22, the input/output control device 40 connects the system input/output channel 50 for the controlled system with one of the first and the second input/output channels for the processor that produces the input/output channel acquisition signal in question.

The second processor 20' is similar in structure and operation to the above-mentioned first processor 10'. When the second CPU 21' recognizes that no failure occurs in the first processor 10' by receiving the first periodic signal S10 from the first CPU 11', the second CPU 21' makes the second processor 20' operate as the backup processor. For this purpose, the second CPU 21' does not supply the input/output control device 40 with the second input/output channel acquisition signal S22, thereby does not use the system input/output channel 50 for the controlled system.

As apparent from the above-mentioned operation, the first processor 10' acquires the system input/output channel 50 for the controlled system to carry out control of the controlled system. The second processor 20' waits as the backup processor.

Description will be made as regards operation in a case where a failure occurs in the first processor 10' which is operable as the active processor.

When failure such as abnormality in software or fault of hardware occurs in the first processor 10', the first CPU 11 stops delivery of the first periodic signal S10 to the second failure detecting circuit 22 of the second processor 20'. In this event, the second failure detecting circuit 22 recognizes that a failure occurs in the first processor 10' and supplies the second CPU 22' with the second monitored result signal S21 indicating that a failure occurs in the first processor 10'.

On reception of the second monitored result signal S21, the second CPU 21' supplies the input/output control device 40 with the second input/output channel acquisition signal S22 to switch control of the controlled system from the first processor 10' to the second processor 20'. The input/output control device 40 disconnects the system input/output channel 50 for the controlled system from the first input/output channel 51 for the first processor 10' and connects the system input/output channel 50 for the controlled system with the second input/output channel 52 for the second processor 20'. Connected to the controlled system, the second CPU 21' carries out transmission and reception of control information to/from the controlled system by using the system input/output channel 50 for the controlled system.

As apparent from the above-mentioned operation, when switching of the processors is carried out, the second processor 20' acting as the backup processor carries out control of the controlled system instead of the first processor 10' serving as the active processor.

As described above, in a conventional fault-tolerant computer system, the CPU, which detects the failure in its mating processor, produces the input/output channel acquisition signal to be operable as the active processor. However, it is impossible in the conventional fault-tolerant computer system to prevent the CPU where a failure occurs in the processor from supplying the input/output channel acquisition signal to the input/output control device. When the CPU where a failure occurs in the processor accidentally supplies the input/output control device with the input/output channel acquisition signal, the system input/output channel for the controlled system is connected to the processor in which the failure occurs. Under the circumstances, erroneous control information is supplied to the controlled system.

Figure 2:
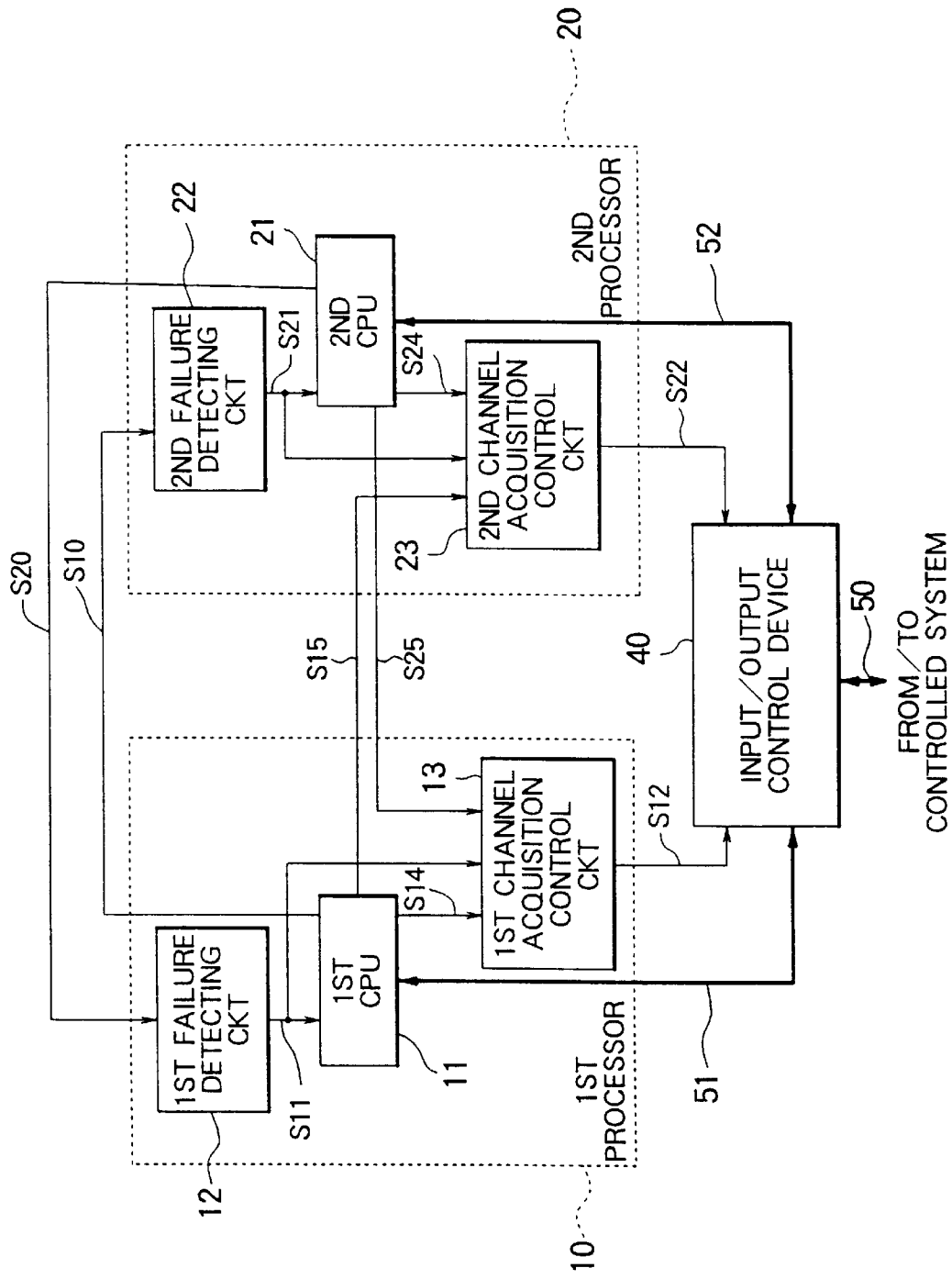
FIG. 2 is a block diagram of a computer system according to a first embodiment of this invention.

Referring to FIG. 2, a computer system according to a first embodiment of this invention is similar in structure to that illustrated in FIG. 1 except that the first and the second processors are modified to be different from those described in conjunction with FIG. 1 as will later become clear. The first and the second processors are therefore depicted at 10 and 20. It is assumed that the first processor 10 serves as an active processor while the second processor 20 acts as a backup processor.

The first processor 10 comprises the first CPU depicted at 11, the first failure detecting circuit 12, and a first channel acquisition control circuit 13. The second processor 20 comprises the second CPU depicted at 21, the second failure detecting circuit 22, and a second channel acquisition control circuit 23.

The first CPU 11 produces the first periodic signal S10 indicative of the operation state of the first CPU 11. The second CPU 21 produces the second periodic signal S20 indicative of the operation state of the second CPU 21.

The first failure detecting circuit 12 in the first processor 10 always monitors the operation state of the second CPU 21 by receiving the second periodic signal S20 indicative of the operation state of the second CPU 21. The first failure detecting circuit 12 delivers the first monitored result signal S11 indicative of its monitored result to the first CPU 11 and the first channel acquisition control circuit 13.

Similarly, the second failure detecting circuit 22 in the second processor 20 always monitors the operation state of the first CPU 11 by receiving the first periodic signal S10 indicative of the operation state of the first CPU 11. The second failure detecting circuit 22 delivers the second monitored result signal S21 indicative of its monitored result to the second CPU 21 and the second channel acquisition control circuit 23.

The first CPU 11 supplies the first channel acquisition control circuit 13 with a first input/output channel acquisition request signal S14 indicative of requiring connection of the first input/output channel 51 for its own processor (the first processor 10) to the system input/output channel 50 for the controlled system. The first CPU 11 supplies the second processor 20 with a first channel acquisition prohibition signal S15 indicating that acquisition for the input/output channel by its mating processor (the second processor 20) is prohibited.

Likewise, the second CPU 21 supplies the second channel acquisition control circuit 23 with a second input/output channel acquisition request signal S24 indicative of requiring connection of the second input/output channel 52 for its own processor (the second processor 20) to the system input/output channel 50 for the controlled system. The second CPU 21 supplies the first processor 10 with a second channel acquisition prohibition signal S25 indicating that acquisition for the input/output channel by its mating processor (the first processor 10) is prohibited.

The first channel acquisition control circuit 13 receives the second channel acquisition prohibition signal S25 from the second CPU 21. The first channel acquisition control circuit 13 receives the first monitored result signal S11 from the first failure detecting circuit 12. Furthermore, the first channel acquisition control circuit 13 receives the first input/output channel acquisition request signal S14 from the first CPU 11. The first channel acquisition control circuit 13 judges whether or not it delivers the first input/output channel acquisition signal S12 to the input/output control device 40 on the basis of the second channel acquisition prohibition signal S25, the first monitored result signal S11, and the first input/output channel acquisition request signal S14.

Similarly, the second channel acquisition control circuit 23 receives the first channel acquisition prohibition signal S15 from the first CPU 11. The second channel acquisition control circuit 23 receives the second monitored result signal S21 from the second failure detecting circuit 22. Furthermore, the second channel acquisition control circuit 23 receives the second input/output channel acquisition request signal S24 from the second CPU 21. The second channel acquisition control circuit 23 judges whether or not it delivers the second input/output channel acquisition signal S22 to the input/output control device 40 on the basis of the first channel acquisition prohibition signal S15, the second monitored result signal S21, and the second input/output channel acquisition request signal S24.

On the basis of the first input/output channel acquisition signal S12 or the second input/output channel acquisition signal S22 supplied from the first processor 10 or the second processor 20, the input/output control device 40 carries out connection and switching of the input/output channels for the first processor 10 or the second processor 20 to the system input/output channel 50 for the controlled system.

Referring to FIG. 2, operation will be described. Description will be at first made as regards an operation in a case where no failure occurs in both of the first processor 10 and the second processor 10.

The first CPU 11 in the first processor 10 periodically sends the first periodic signal S10 indicating that no failure occurs in its own CPU (the first CPU 11) to the second failure detecting circuit 22 of its mating processor (the second processor 20). Similarly, the first failure detecting circuit 12 receives the second periodic signal S20 from the second processor 20 and supplies the first CPU 11 and the first channel acquisition control circuit 13 with the first monitored result signal S11 indicating that no failure occurs in the second processor 20. As described above, the first failure detecting circuit 12 may be composed of general electronic circuit elements.

In the example being illustrated, the first CPU 11 produces, as the first channel acquisition prohibition signal S15, a signal having a logic value indicating that acquisition of the system input/output channel 50 by the second processor 20 is not prohibited. The first CPU 11 may produce, as the first channel acquisition prohibition signal S15, a signal having a logic value indicating that acquisition of the system input/output channel 50 by the second processor 20 is prohibited.

Inasmuch as the first CPU 11 is operable as an active one, the first channel acquisition control circuit 13 receives the first input/output channel acquisition request signal S14 and the second channel acquisition prohibition signal S25 from the first CPU 11 and the second processor 20, respectively. In this event, inasmuch as no failure occurs in the first processor 10, the second channel acquisition prohibition signal S25 has a logic value indicating that acquisition of the system input/output channel 50 by the first processor 10 is not prohibited.

As a result, the first channel acquisition control circuit 13 supplies the input/output control device 40 with the first input/output channel acquisition signal S12. Responsive to the first input/output channel acquisition signal S12 supplied from the first channel acquisition control circuit 13, the input/output control device 40 connects the first input/output channel 51 for the first processor 10 with the system input/output channel 50 for the controlled system. Under the circumstances, the first processor 10 serves as the active processor which carries out transmission and reception of control information to/from the controlled system by using the system input/output channel 50 for the controlled system.

The second processor 20 carries out similar operation in the first processor 10. When the second CPU 21 recognizes that no failure occurs in the first processor 10, the second CPU 21 does not supply the second input/output channel acquisition signal S22 to the input/output control device 40. This is because the second CPU 21 makes the second processor 20 operate as the backup processor.

As apparent from the above-mentioned operation, the first processor 10 acquires the system input/output channel 50 for the controlled system to carry out control for the controlled system. The second processor 20 waits as the backup processor.

Description will be made as regards an operation in a case where a failure occurs in the first processor 10 which is operable as the active processor.

When a failure due to such as abnormality in software or a fault of hardware occurs in the first processor 10, the first CPU 11 cannot deliver the first periodic signal S10 to its mating processor (the second processor 20). When the second failure detecting circuit 22 does not receive the first periodic signal S10 from the first processor 10, the second failure detecting circuit 22 recognizes that a failure occurs in the first processor 10 and supplies the second CPU 21 and the second channel acquisition control circuit 23 with the second monitored result signal S21 indicating that a failure occurs in the first processor 10.

Supplied with the second monitored result signal S21 indicating that a failure occurs in the first processor 10 from the second failure detecting circuit 22, the second CPU 21 supplies the second input/output channel acquisition request signal S24 to the second channel acquisition control circuit 23 to switch its own processor (the second processor 20) from the backup one to the active one.

Although the second channel acquisition control circuit 23 receives the first channel acquisition prohibition signal S15 from the first processor 10, the second channel acquisition control circuit 23 decides that the first channel acquisition prohibition signal S15 is invalid because the second monitored result signal S21 indicates that a failure occurs in the first processor 10. The second channel acquisition control circuit 23 gives priority to the input/output channel acquisition request by the second processor 20 and supplies the second input/output channel acquisition signal S22 to the input/output control device 40.

On the basis of the second input/output channel acquisition signal S22 supplied from the second channel acquisition control circuit 23, the input/output control device 40 switches connection of the system input/output channel 50 for the controlled system from the first input/output channel 51 for the first processor 10 to the second input/output channel 52 for the second processor 20.

In this event, the second CPU 21 supplies the first channel acquisition control circuit 13 in the first processor 10 with the second channel acquisition prohibition signal S25 having the logic value indicating that acquisition of the system input/output channel 50 by the first processor 10 is prohibited.

In the first processor 10, inasmuch as the first failure detecting circuit 12 recognizes that the second processor 20 is in the normal condition, the first failure detecting circuit 12 supplies the first channel acquisition control circuit 13 with the first monitored result signal S11 indicating that no failure occurs in the second processor 20. Responsive to the first monitored result signal S11, the first channel acquisition control circuit 13 decides that the second channel acquisition prohibition signal S25 is valid. Inasmuch as the second channel acquisition prohibition signal S25 is valid and has the logic value indicating that acquisition of the system input/output channel 50 by the first processor 10 is prohibited, the first channel acquisition control circuit 13 does not supply the input/output control device 40 with the first channel acquisition signal S12 although the first channel acquisition control circuit 13 receives the first input/output channel acquisition request signal S14 from the first CPU 11.

As apparent from the above-mentioned operation, acquisition of the system input/output channel 50 by the first processor 10 is prohibited, the second processor 20 acting as the backup processor acquires the system input/output channel 50 to carry out control for the controlled system.

When a failure occurs in the second processor 20 serving as the backup processor, acquisition of the system input/output channel 50 by the second processor 20 is prohibited in a similar manner described above, thereby the first processor 10 carries out control for the controlled system.

As described above, although the processor in which a failure occurs (which is called a failure processor) requires acquisition of the system input/output channel for some cause or other, it is possible to prohibit it and it is possible for the processor where no failure occurs to acquire the system input/output channel for the controlled system without effect of the failure processor.

Figure 3:
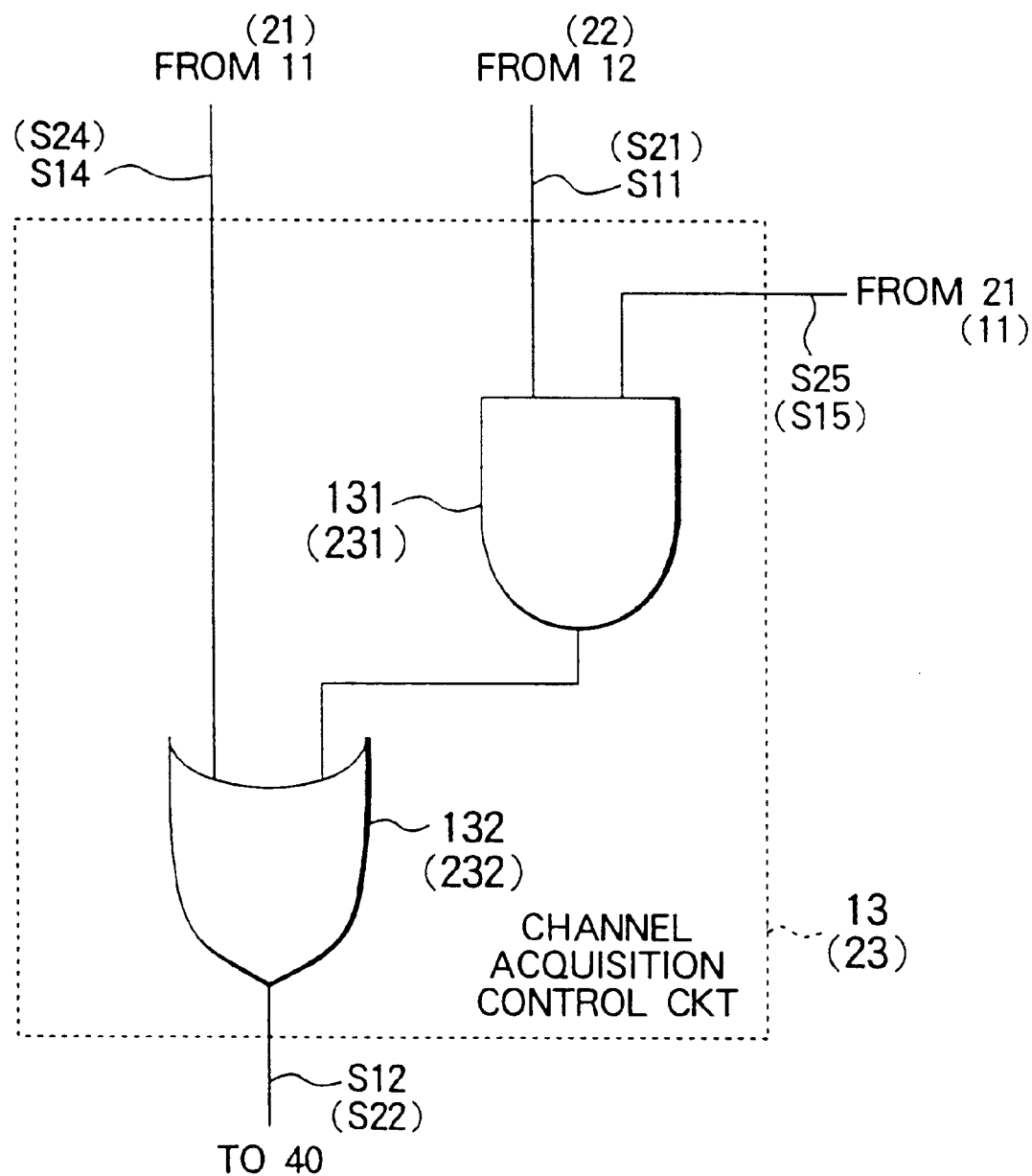
FIG. 3 is a block diagram of a channel acquisition control circuit for use in the computer system illustrated in FIG. 2.

Turning to FIG. 3, the first channel acquisition control circuit 13 comprises a first AND gate 131 and a front OR gate 132. The first AND gate 131 is supplied with the first monitored result signal S11 and the second channel acquisition prohibition signal S25 from the first failure detecting circuit 12 and the second CPU 21 in the second processor 20, respectively. Responsive to the first monitored result signal S11 and the second channel acquisition prohibition signal S25, the first AND gate produces a first AND'ed output signal. The first AND'ed output signal is supplied to the first OR gate 132. The first OR gate 132 is supplied with the first input/output channel acquisition request signal S14 from the first CPU 11. Responsive to the first AND'ed output signal and the first input/output channel acquisition request signal S14, the first OR gate 132 produces a first OR'ed output signal as the first input/output channel acquisition signal S12.

Similarly, the second channel acquisition control circuit 23 comprises a second AND gate 231 and a second OR gate 232. The second AND gate 231 is supplied with the second monitored result signal S21 and the first channel acquisition prohibition signal S15 from the second failure detecting circuit 22 and the first CPU 11 in the first processor 10, respectively. Responsive to the second monitored result signal S21 and the first channel acquisition prohibition signal S15, the second AND gate 231 produces a second AND'ed output signal. The second AND'ed output signal is supplied to the second OR gate 232. The second OR gate 232 is supplied with the second input/output channel acquisition request signal S24 from the second CPU 21. Responsive to the second AND'ed output signal and the second input/output channel acquisition request signal S24, the second OR gate 232 produces a second OR'ed output signal as the second input/output channel acquisition signal S22.

Operation of the first channel acquisition signal control circuit 13 will be described. It will be assumed as follows. The first monitored result signal S11 has a logic one value when no failure occurs in the second processor 20. The first monitored result signal S11 has a logic zero value when a failure occurs in the second processor 20. The second channel acquisition prohibition signal S25 has a logic zero value when acquisition of the system input/output channel 50 by the first processor 10 is not prohibited. The second channel acquisition prohibition signal S25 has a logic one value when acquisition of the system input/output channel 50 by the first processor 10 is prohibited. The first channel acquisition request signal S14 has a logic zero value when the first CPU 11 requires acquisition of the system input/output channel 50 for the controlled system. The first channel acquisition request signal S14 has a logic one value when the first CPU 11 does not require acquisition of the system input/output channel 50 for the controlled system.

Description will be at first made as regards an operation in a case where no failure occurs in both of the first and the second processors 10 and 20. In this event, the first monitored result signal S11 has the logic one value and the second channel acquisition prohibition signal S25 has the logic zero value. Responsive to the first monitored result signal S11 having the logic one value and the second channel acquisition prohibition signal S25 having the logic zero value, the first AND gate 131 produces the first AND'ed output signal having the logic zero value. Inasmuch as the first AND'ed output signal has the logic zero value, the first OR gate 132 produces, as the first input/output channel acquisition signal S12, a signal having the logic value equal to that of the first channel acquisition request signal S14. As a result, it is possible for the first processor 10 to acquire the system input/output channel 50 for the controlled system.

Description will be made as regards an operation in a case where a failure occurs in the first processor 10. In this event, the first monitored result signal S11 has the logic one value and the second channel acquisition prohibition signal S25 has the logic one value. Responsive to the first monitored result signal S11 having the logic one value and the second channel acquisition prohibition signal S25 having the logic one value, the first AND gate 131 produces the first AND'ed output signal having the logic one value. Inasmuch as the first AND'ed output signal has the logic one value, the first OR gate 132 produces, as the first input/output channel acquisition signal S12, a signal having the logic one value irrespective of the logic value of the first channel acquisition request signal S14. As a result, it is possible for the first processor 10 to prohibit acquisition of the system input/output channel 50 for the controlled system.

Description will be made as regards an operation in a case where a failure occurs in the second processor 20. In this event, the first monitored result signal S11 has the logic zero value. Accordingly, the first AND gate 131 produces the first AND'ed output signal having the logic zero value irrespective of the logic value of the second channel acquisition prohibition signal S25. Inasmuch as the first AND'ed output signal has the logic zero value, the first OR gate 132 produces, as the first input/output channel acquisition signal S12, a signal having the logic value equal to that of the first channel acquisition request signal S14. As a result, it is possible for the first processor 10 to acquire the system input/output channel 50 for the controlled system.

If a mating processor to be monitored by its own processor is put into a normal condition, its own processor carries out control on the basis of information which is supplied from the mating processor and which indicates whether or not its own processor acquires the system input/output channel for the controlled system. If a failure occurs in the mating processor to be monitored by its own processor, its own processor carries out control in defiance of information which is supplied from the mating processor and which indicates whether or not its own processor acquires the system input/output channel for the controlled system.

Figure 4:
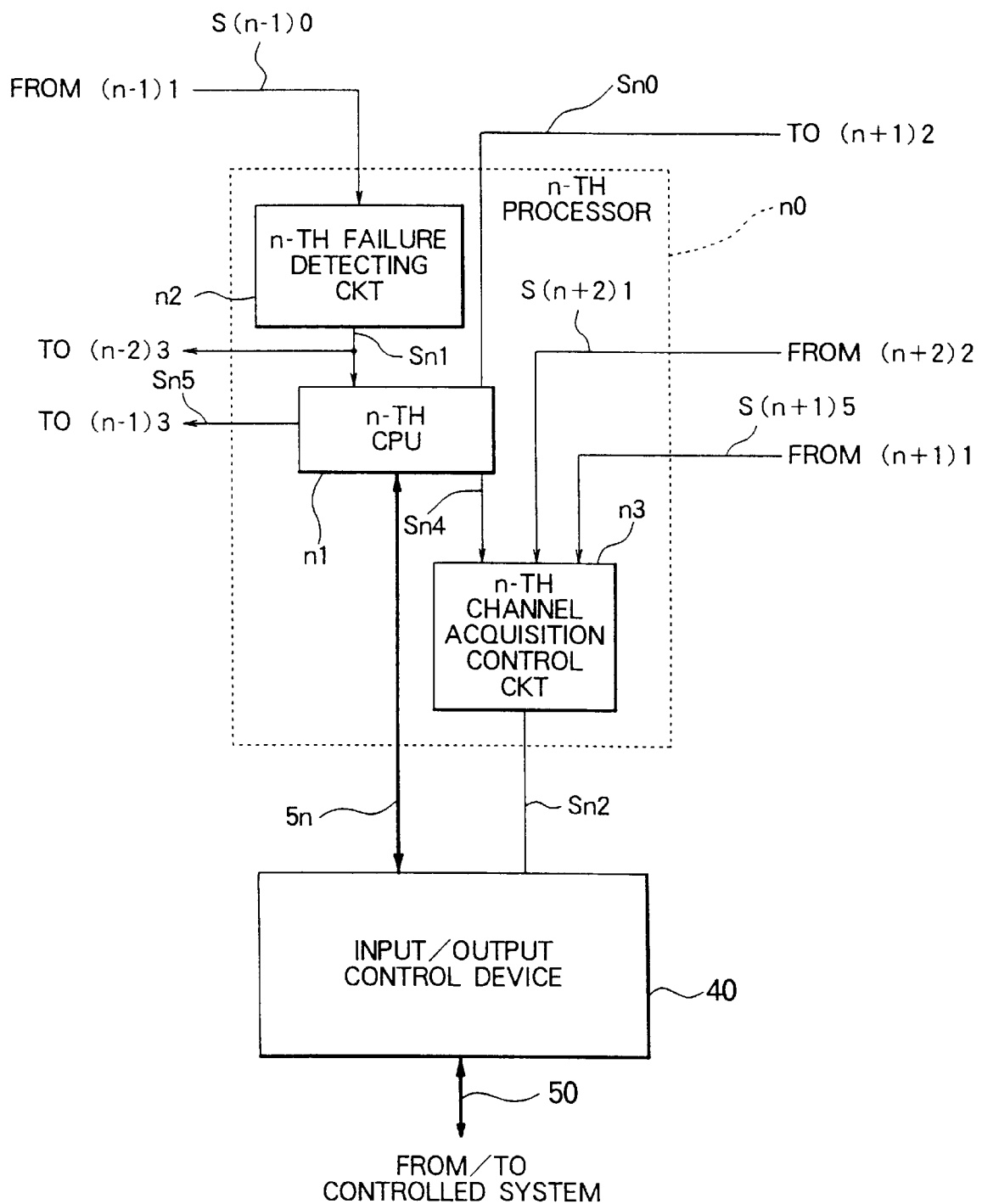
FIG. 4 is a block diagram of a computer system according to a second embodiment of this invention.

Referring to FIG. 4, a computer system according to a second embodiment of this invention is similar in structure to that illustrated in FIG. 1 except that the computer system comprises first through N-th processors 10 to N0 which are provided with first through N-th input/output channels 51 to 5N, respectively, where N represents a positive integer which is not less than two. In FIG. 4, an n-th processor n0 is illustrated alone for simplification of drawing, where n represents each of 1 through N, both inclusive. The n-th processor n0 is connected to an (n−1)-th processor (n−1)0, an (n−2)-th processor (n−2)0, an (n+1)-th processor (n+1)0, and an (n+2)-th processor (n+2)0. When n is equal to N, (n+1) turns back to 1. When (n+2) exceeds N, (n+2) turns back to the number obtained by subtracting N from (n+2). When n is equal to 1, (n−1) turns back to N. When (n−2) is less than 1, (n−2) turns back to the number obtained by adding (n−2) and N.

The input/output control device 40 is coupled to the first through the N-th input/output channels 51 to 5N and to the system input/output channel 50 for the controlled system. In the manner which will later become clear, the input/output control device 40 connects the system input/output channel 50 to one of the first through the N-th input/output channels 51 to 5N.

The n-th processor n0 comprises an n-th central processing unit (CPU) n1 connected to an n-th input/output channel 5n, the (n−1)-th processor (n−1)0, and the (n+1)-th processor (n+1)0 for managing the whole of the n-th processor n0, an n-th failure detecting circuit n2 connected to the (n−1)-th processor (n−1)0 and the (n−2)-th processor (n−2)0 for always monitoring an operation state in the (n−1)-th processor (n−1)0, and an n-th channel acquisition control circuit n3 connected to the n-th CPU n0, the input/output control device 40, the (n+1)-th processor (n+1)0, and the (n+2)-th processor (n+2)0 for directing control operation for the input/output control device 40.

The n-th CPU n0 periodically supplies the (n+1)-th processor (n+1)0 with an n-th periodic signal Sn0 indicative of the operation state of the n-th CPU n0. The n-th failure detecting circuit n2 always monitors the operation state in the (n−1)-th processor (n−1)0 by receiving an (n−1)-th periodic signal S(n−1)0 from an (n−1)-th CPU (n−1)1 in the (n−1)-th processor (n−1)0. The n-th failure detecting circuit n2 delivers an n-th monitored result signal Sn1 to the n-th CPU n1 and an (n−2)-th channel acquisition control circuit (n−2)3 in the (n−2)-th processor (n−2)0.

The n-th CPU n1 supplies the n-th channel acquisition control circuit n3 with an n-th input/output channel acquisition request signal Sn4 when the n-th CPU n1 requires acquisition for the system input/output channel 50. The n-th CPU n1 supplies an (n−1)-th channel acquisition control circuit (n−1)3 of the (n−1)-th processor (n−1)0 with an n-th channel acquisition prohibition signal Sn5 indicating that acquisition of the system input/output channel 50 by the (n−1)-th processor (n−1)0 is prohibited when the n-th monitored result signal Sn1 indicates that a failure occurs in the (n−1)-th processor (n−1)0.

The n-th channel acquisition control circuit n3 receives an (n+2)-th monitored result signal S(n+2)1, the n-th input/output channel acquisition request signal Sn4, and an (n+1)-th channel acquisition prohibition signal S(n+1)5 from an (n+2)-th failure detecting circuit (n+2)2 of the (n+2)-th processor (n+2)0, the n-th CPU n1, and an (n+1)-th CPU (n+1)1 of the (n+1)-th processor (n+1)0. The n-th channel acquisition control circuit n3 judges whether or not the system input/output channel 40 can be acquired on the basis of the (n+2)-th monitored result signal S(n+2)1 and the (n+1)-th channel acquisition prohibition signal S(n+1)5. Responsive to the n-th input/output channel acquisition request signal Sn4, the n-th channel acquisition control circuit n3 supplies the input/output control device 40 with an n-th input/output channel acquisition signal Sn2 on the basis of the (n+2)-th monitored result signal S(n+2)1 and of the (n+1)-th channel acquisition prohibition signal S(n+1)5.

Figure 5:
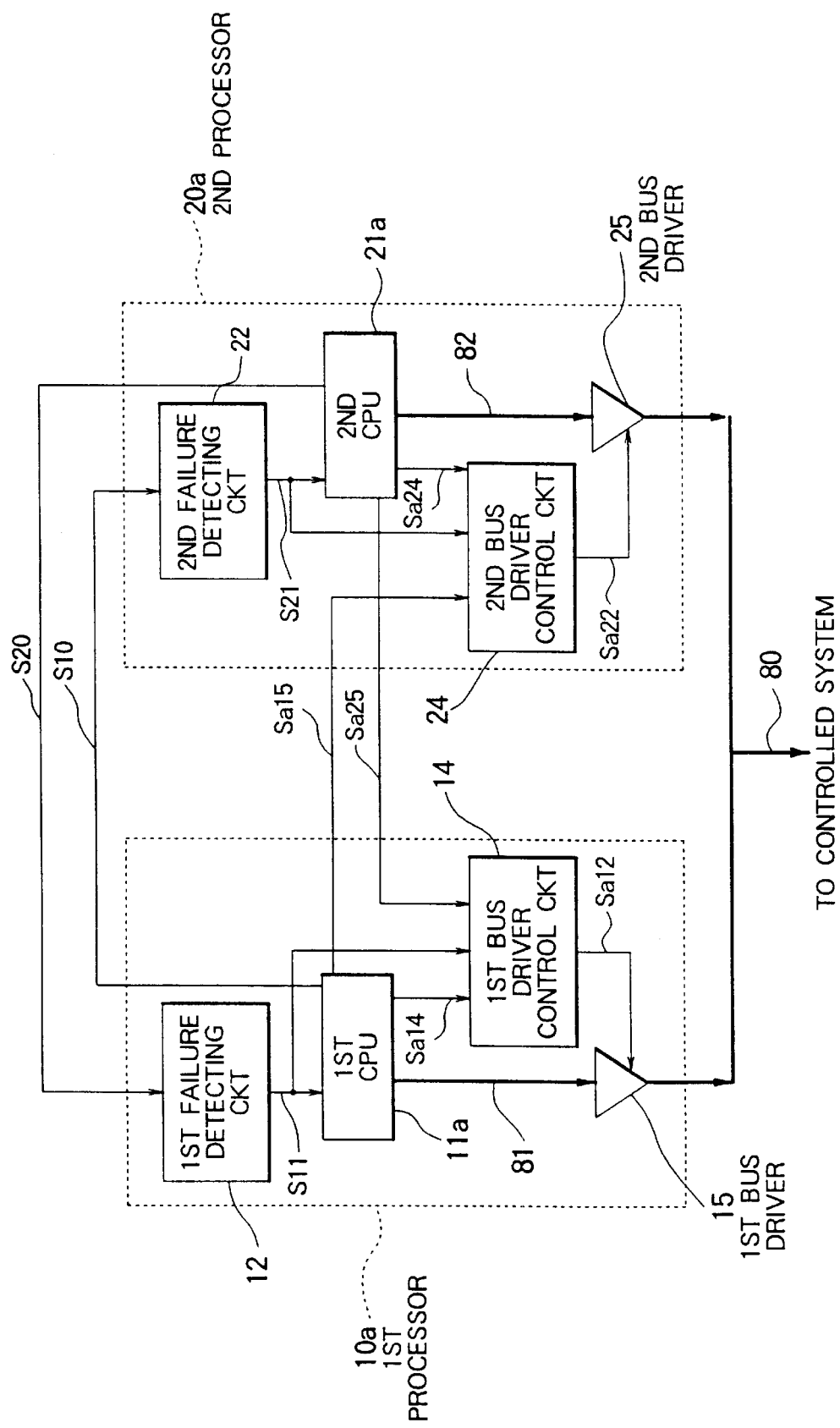
FIG. 5 is a block diagram of a computer system according to a third embodiment of this invention.

Referring to FIG. 5, a computer system according to a third embodiment of this invention is similar in structure to that illustrated in FIG. 2 except that the first and the second processors are modified to be different from those described in conjunction with FIG. 2 and the computer system comprises an outer bus 80 instead of the system input/output channel 40 as will later become clear. The first and the second processors are therefore depicted at 10a and 20a. It is assumed that the first processor 10a serves as an active processor while the second processor 20a acts as a backup processor.

The first processor 10a comprises the first CPU depicted at 11a, the first failure detecting circuit 12, a first bus driver control circuit 14, and a first bus driver 15. The second processor 20a comprises the second CPU depicted at 21a, the second failure detecting circuit 22, a second bus driver control circuit 24, and a second bus driver 25.

The first CPU 11a in the first processor 10a produces the first periodic signal S10 indicative of the operation state of the first CPU 11a. The second CPU 21a in the second processor 20a produces the second periodic signal S20 indicative of the operation state of the second CPU 21a.

The first failure detecting circuit 12 in the first processor 10a always monitors the operation state of the second CPU 21 by receiving the second periodic signal S20 indicative of the operation state of the second CPU 21a. The first failure detecting circuit 12 delivers the first monitored result signal S11 indicative of its monitored result to the first CPU 11 and the first bus driver control circuit 14.

Similarly, the second failure detecting circuit 22 in the second processor 20a always monitors the operation state of the first CPU 11a by receiving the first periodic signal S10 indicative of the operation state of the first CPU 11a. The second failure detecting circuit 22 delivers the second monitored result signal S21 indicative of its monitored result to the second CPU 21a and the second bus driver control circuit 24.

The first CPU 11a supplies the first bus driver control circuit 14 with a first bus driver control request signal Sa14. The first CPU 11a supplies the second processor 20a with a first bus output prohibition signal Sa15. The first CPU 11a is connected to the first bus driver 15 via a first internal bus 81. The first CPU 11a sends a first bus output signal on the first internal bus 81.

Likewise, the second CPU 21a supplies the second bus driver control circuit 24 with a second bus driver control request signal Sa24. The second CPU 21a supplies the first processor 10a with a second bus output prohibition signal Sa25. The second CPU 21a is connected to the second bus driver 25 via a second internal bus 82. The second CPU 21a sends a second bus output signal on the second internal bus 82.

The first bus driver control circuit 14 receives the second bus output prohibition signal Sa25 from its mating CPU or the second CPU 21a. The first bus driver control circuit 14 receives the first monitored result signal S11 from the first failure detecting circuit 12. Furthermore, the first bus driver control circuit 14 receives the first bus driver control request signal Sa14 from the first CPU 11a. The first bus driver control circuit 14 supplies the first bus driver 15 with a first bus driver control signal Sa12 on the basis of the second bus output prohibition signal Sa25, the first monitored result signal S11, and the first bus driver control request signal Sa14.

Similarly, the second bus driver control circuit 24 receives the first bus output prohibition signal Sa15 from its mating CPU or the first CPU 11a. The second bus driver control circuit 24 receives the second monitored result signal S21 from the second failure detecting circuit 22. Furthermore, the second bus driver control circuit 24 receives the second bus driver control request signal Sa24 from the second CPU 21a. The second bus driver control circuit 24 supplies the second bus driver 25 with a second bus driver control signal Sa22 on the basis of the first bus output prohibition signal Sa15, the second monitored result signal S21, and the second bus driver control request signal Sa24.

Responsive to the first bus driver control signal Sa12 supplied from the first bus driver control circuit 14, the first bus driver 15 delivers the first bus output signal on the first internal bus 81 to the outer bus 80. Responsive to the second bus driver control signal Sa22 supplied from the second bus driver control circuit 24, the second bus driver 25 delivers the second bus output signal on the second internal bus 82 to the outer bus 80.

Referring to FIG. 5, operation will be described. Description will be at first made as regards an operation in a case where no failure occurs in both of the first processor 10a and the second processor 20a.

The first CPU 11a in the first processor 10a periodically sends the first periodic signal S10 indicating that no failure occurs in its own CPU (the first CPU 11) to the second failure detecting circuit 22 of its mating processor (the second processor 20a). The first failure detecting circuit 12 receives the second periodic signal S20 from the second processor 20a and supplies the first CPU 11a and the first bus driver control circuit 14 with the first monitored result signal S11 indicating that no failure occurs in the second processor 20a.

In the example being illustrated, the first CPU 11a produces, as the first bus output prohibition signal Sa15, a signal having a logic value indicating that bus output for the second processor 20a is not prohibited. The first CPU 11a may produce, as the first bus output prohibition signal Sa15, a signal having a logic value indicating that bus output for the second processor 20a is prohibited. In addition, the first CPU 11a supplies the first bus driver control circuit 14 with the first us driver control request signal Sa14 indicative of use for the outer bus 80.

The first bus driver control circuit 14 receives the second bus output prohibition signal Sa25 from the second processor 20a. Inasmuch as no failure occurs in the first processor 10a, the second bus output prohibition signal Sa25 has a logic value indicating that use of the outer bus 80 by the first processor 10a is not prohibited. As a result, the first bus driver control circuit 14 supplies the first bus driver 15 with the first bus driver control request signal Sa14 as the first bus driver control signal Sa12.

The first bus driver 15 receives the first bus driver control signal Sa12 from the first bus driver control circuit 14. Inasmuch as the first bus driver control signal Sa12 indicates use of the outer bus 80, the first bus driver 15 delivers the first bus output signal on the first internal bus 81 to the outer bus 80.

As apparent from the above-mentioned operation, the first CPU 11a carries out transmission of control information to the controlled system via the first bus driver 15.

The second processor 20a carries out similar operation in the first processor 10a. When the second CPU 21a recognizes that no failure occurs in the first processor 10a, the second CPU 21a makes the second bus driver control circuit 24 supply the second bus driver 25 with the second bus driver control signal Sa22 indicative of no use of the outer bus 80. This is because the second CPU 21a makes the second processor 20a operate as the backup processor. As a result, the second bus driver 25 does not carry out output operation for the outer bus 80.

As apparent from the above-mentioned operation, the first processor 10a uses the outer bus 80 to carry out control for the controlled system. The second processor 20a waits as the backup processor.

Description will be made as regards an operation in a case where a failure occurs in the first processor 10a which is operable as the active processor.

When a failure due to such as abnormality in software or a fault of hardware occurs in the first processor 10a, the first CPU 11a cannot deliver the first periodic signal S10 to its mating processor (the second processor 20a). When the second failure detecting circuit 22 does not receive the first periodic signal S10 from the first processor 10a, the second failure detecting circuit 22 recognizes that a failure occurs in the first processor 10a and supplies the second CPU 21a and the second bus driver control circuit 24 with the second monitored result signal S21 indicating that a failure occurs in the first processor 10a.

Supplied with the second monitored result signal S21 indicating that a failure occurs in the first processor 10a from the second failure detecting circuit 22, the second CPU 21a supplies the second bus driver control circuit 24 with the second bus driver control request signal Sa24 indicative of request of use for the outer bus 80 to switch its own processor (the second processor 20) from the backup one to the active one.

Inasmuch as the second monitored result signal S21 supplied from the second failure detecting circuit 22 indicates that a failure occurs in the first processor 10a, the second bus driver control circuit 24 decides that the first bus output prohibition signal Sa15 supplied from the first processor 10a is invalid because the second monitored result signal S21 and the second bus driver control circuit 24 supplies the second bus driver control signal Sa22 to the second bus driver 25 on the basis of the second bus driver control request signal Sa24 supplied from the second CPU 21a.

Supplied with the second bus driver control signal Sa22 indicative of use of the outer bus 80, the second bus driver 25 carries out operation so as to deliver the second bus output signal on the second internal bus 82 to the outer bus 80.

As a result, the second CPU 21a can carry out transmission of control information to the controlled system via the second bus driver 25. The second CPU 21a supplies the first bus driver control circuit 14 in the first processor 10a with the second bus output prohibition signal Sa25 having the logic value indicating that use of the outer bus 80 by the first processor 10a is prohibited.

In the first processor 10a, the first failure detecting circuit 12 supplies the first bus driver control circuit 14 with the first monitored result signal S11 indicating that no failure occurs in the second processor 20a. As a result, the first bus driver control circuit 14 decides that the second bus output prohibition signal Sa25 supplied from the second processor 20a has the logic value of valid. The first bus driver control circuit 14 supplies the first bus driver 15 with the first bus driver control signal Sa12 indicative of no use of the outer bus 80 irrespective of the first bus driver control request signal Sa14 supplied from the first CPU 11a. Accordingly, the first bus driver 15 stops output operation for the outer bus 80.

As apparent from the above-mentioned operation, use of the outer bus 80 by the first processor 10 acting as the active processor is prohibited, and the second processor 20 acting as the backup processor uses the outer bus 80 to carry out control for the controlled system.

When a failure occurs in the second processor 20a serving as the backup processor, use of the outer bus 80 by the second processor 20a is prohibited in a similar manner described above, thereby the first processor 10a carries out control for the controlled system.

As described above, it is possible for the third embodiment to obtain the effect similar to that in the first embodiment. Inasmuch as the outer bus 80 is used to transmit the control information to the controlled system, it is unnecessary to use the input/output control device where protection for failure is not considered. As a result, it is possible to construct the computer system having the improved fault tolerance.

In addition, this invention has similar effect in bus output control of structure where three or more processors are connected to the outer bus 80.

Figure 6:
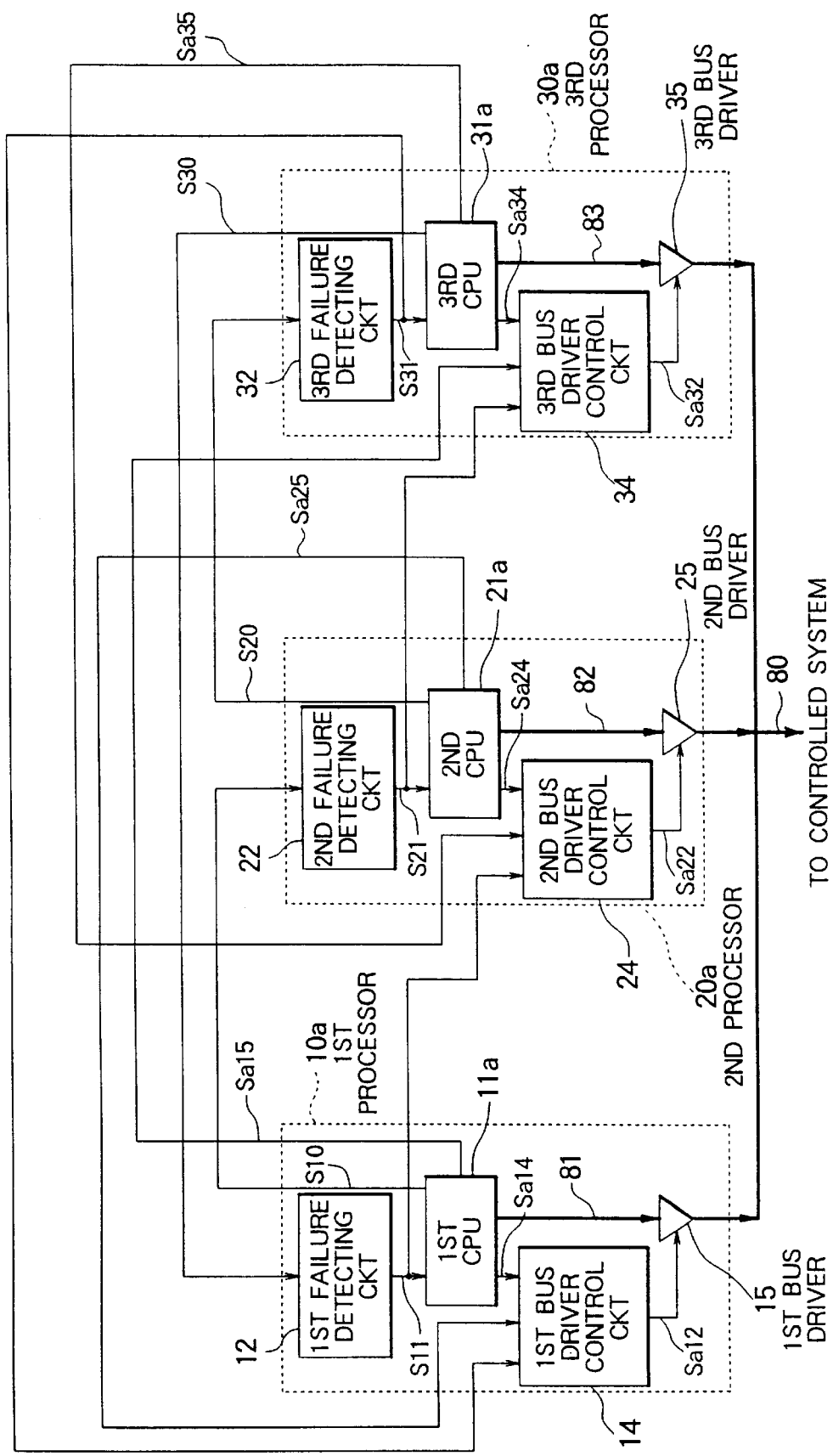
FIG. 6 is a block diagram of a computer system according to a fourth embodiment of this invention.

Referring to FIG. 6, a computer system according to a fourth embodiment of this invention is similar in structure to that illustrated in FIG. 5 except that the computer system further comprises a third processor 30a. The third processor 30a comprises a third CPU 31, a third failure detecting circuit 32, a third bus driver control circuit 34, and a third bus driver 35. In the example being illustrated, the second processor 20a carries out failure detection of the first processor 10a. The third processor 30a carries out failure detection of the second processor 20a. The first processor 10a carries out failure detection of the third processor 30a.

The first CPU 11a in the first processor 10a produces the first periodic signal S10 indicative of the operation state of the first CPU 11a. The second CPU 21a in the second processor 20a produces the second periodic signal S20 indicative of the operation state of the second CPU 21a. The third CPU 31a in the third processor 30a produces a third periodic signal S30 indicative of operation state of the third CPU 31a.

The first failure detecting circuit 12 in the first processor 10a always monitors the operation state of the third CPU 31 by receiving the third periodic signal S30 indicative of the operation state of the third processor 30a. The first failure detecting circuit 12 delivers the first monitored result signal S11 indicative of its monitored result to the first CPU 11a and the second bus driver control circuit 24 of the second processor 20a.

Similarly, the second failure detecting circuit 22 in the second processor 20a always monitors the operation state of the first CPU 11 by receiving the first periodic signal S10 indicative of the operation state of the first CPU 11a. The second failure detecting circuit 22 delivers the second monitored result signal S21 indicative of its monitored result to the second CPU 21a and the third bus driver control circuit 34 of the third processor 30a.

The third failure detecting circuit 32 in the third processor 30a always monitors the operation state of the second CPU 21a by receiving the second periodic signal S20 indicative of the operation state of the second CPU 21a. The third failure detecting circuit 32 delivers a third monitored result signal S31 indicative of its monitored result to the third CPU 31a and the first bus driver control circuit 14 of the first processor 10a.

By way of example, description will be made as regards structure of the first processor 10a.

The first CPU 11a supplies the first bus driver control circuit 14 with the first bus driver control request signal Sa14. The first CPU 11a supplies the third processor 30b with the first bus output prohibition signal Sa15. The first CPU 11a is connected to the first bus driver 15 via the first internal bus 81. The first CPU 11a sends the first bus output signal on the first internal bus 81. The first CPU 11a supplies the second failure detecting circuit 22 of the second processor 20a with the first periodic signal S10 indicative of the operation state of its own processor (the first processor 11b).

The first bus driver control circuit 14 receives the second bus output prohibition signal Sa25 from its mating CPU or the second CPU 21a. The first bus driver control circuit 14 receives a third monitored result signal S31 indicative of a monitored result for the operation state of the second processor 20a from the third failure detecting circuit 32 in the third processor 30a. Furthermore, the first bus driver control circuit 14 receives the first bus driver control request signal Sa14 from the first CPU 11a. The first bus driver control circuit 14 supplies the first bus driver 15 with the first bus driver control signal Sa12 on the basis of the second bus output prohibition signal Sa25, the third monitored result signal S31, and the first bus driver control request signal Sa14.

Responsive to the first bus driver control signal Sa12 supplied from the first bus driver control circuit 14, the first bus driver 15 delivers the first but output signal on the first internal bus 81 to the outer bus 80.

As described above, in general, the processor monitoring a monitored processor supplies its monitored result and an operation state of its own processor to a bus driver control circuit and a failure detecting circuit in other processor except for its own processor and the monitored processor and delivers the bus output prohibition signal to the bus driver control circuit in the monitored processor.

Referring to FIG. 6, operation will be described. Description will be at first made as regards an operation in a case where no failure occurs in all of the first processor 10a, the second processor 20a, and the third processor 30a.

The first CPU 11a in the first processor 10a periodically sends the first periodic signal S10 indicating that no failure occurs in its own CPU (the first CPU 11) to the second failure detecting circuit 22 of its mating processor (the second processor 20a). The first failure detecting circuit 12 receives the third periodic signal S30 from the third processor 30a and supplies the first CPU 11a and the second bus driver control circuit 24 of the second processor 20a with the first monitored result signal S11 indicating that no failure occurs in the third processor 30a.

In the example being illustrated, the first CPU 11a produces, as the first bus output prohibition signal Sa15, a signal having a logic value indicating that bus output for the third processor 30a is not prohibited. The first CPU 11a may produce, as the first bus output prohibition signal Sa15, a signal having a logic value indicating that bus output for the third processor 30a is prohibited. In addition, the first CPU 11a supplies the first bus driver control circuit 14 with the first bus driver control request signal Sa14.

The first bus driver control circuit 14 receives the second bus output prohibition signal Sa25 from the second processor 20a. Inasmuch as no failure occurs in the first processor 10a, the second bus output prohibition signal Sa25 has a logic value indicating that use of the outer bus 80 by the first processor 10a is not prohibited. As a result, the first bus driver control circuit 14 supplies the first bus driver 15 with the first bus driver control request signal Sa14 as the first bus driver control signal Sa12.

The first bus driver 15 receives the first bus driver control signal Sa12 from the first bus driver control circuit 14. When the first bus driver control signal Sa12 indicates use of the outer bus 80, the first bus driver 15 delivers the first bus output signal on the first internal bus 81 to the outer bus 80. As a result, the first CPU 11a can deliver the first bus output signal to the outer bus 80 via the first bus driver 15.

Both of the second processor 20a and the third processor 30a carry out similar operation in the first processor 10a to carry out output operation for the outer bus 80 on using of the outer bus 80.

Description will be made as regards an operation in a case where a failure occurs in the first processor 10a.

When a failure due to such as abnormality in software or fault of hardware occurs in the first processor 10a, the first CPU 11a cannot deliver the first periodic signal S10 to the second failure detecting circuit 22 of the second processor 20a. When the second failure detecting circuit 22 does not receive the first periodic signal S10 from the first processor 10a, the second failure detecting circuit 22 recognizes that a failure occurs in the first processor 10a. And then the second failure detecting circuit 22 supplies the second CPU 21a and the third bus driver control circuit 34 of the third processor 30a with the second monitored result signal S21 indicating that a failure occurs in the first processor 10a.

Supplied with the second monitored result signal S21 indicating that a failure occurs in the first processor 10, the second CPU 21a recognizes that a failure occurs in the first processor 10a and supplies the first bus driver control circuit 14 of the first processor 10a with the second bus output prohibition signal Sa25 having the logic value indicative of prohibition of but output.

Inasmuch as the first bus driver control circuit 14 of the first processor 10a receives the second bus output prohibition signal Sa25 from the second CPU 21a and as the third monitored result signal S31 supplied form the third failure detecting circuit 32 of the third processor 30a indicates that no failure occurs in the second processor 20a, the first bus driver control circuit 14 decides that the second bus output prohibition signal Sa25 supplied from the second CPU 21a is valid. Inasmuch as the second bus output prohibition signal Sa25 is valid and as the second bus output prohibition signal Sa25 has the logic value indicating that use of the outer bus 80 by the first processor 10a is prohibited, the first bus driver control circuit 14 supplies the first bus driver 15 with the first bus driver control signal Sa12 indicative of no use of the outer bus 80 irrespective of the logic value of the first bus driver control request signal Sa14 supplied from the first CPU 11a.

Inasmuch as the first bus driver control signal Sa12 indicates no use of the outer bus 80, the first bus driver 15 stops output operation for the outer bus 80. Accordingly, it is possible to prohibit use of the outer bus 80 by the first processor 10a in which a failure occurs.

Inasmuch as the second monitored result signal S21 supplied from the second failure detecting circuit 22 in the second processor 20a indicates that a failure occurs in the first processor 10a, the third bus driver control circuit 34 of the third processor 30a decides that the first bus output prohibition signal Sa15 supplied from the first processor 10a is invalid. The third bus driver control circuit 34 supplies the third bus driver 35 with, as the third bus driver control signal Sa32, the third bus driver control request signal Sa34 which the third CPU 31a in its own processor or the third processor 30a produces. As a result, the third processor 30a can use the outer bus 80 regardless of failure in the first processor 10a.

When a failure occurs in the second processor 20a or the third processor 30a, use of the outer bus 80 by its failure processor can be prohibited in a similar manner described above.

Figure 7:
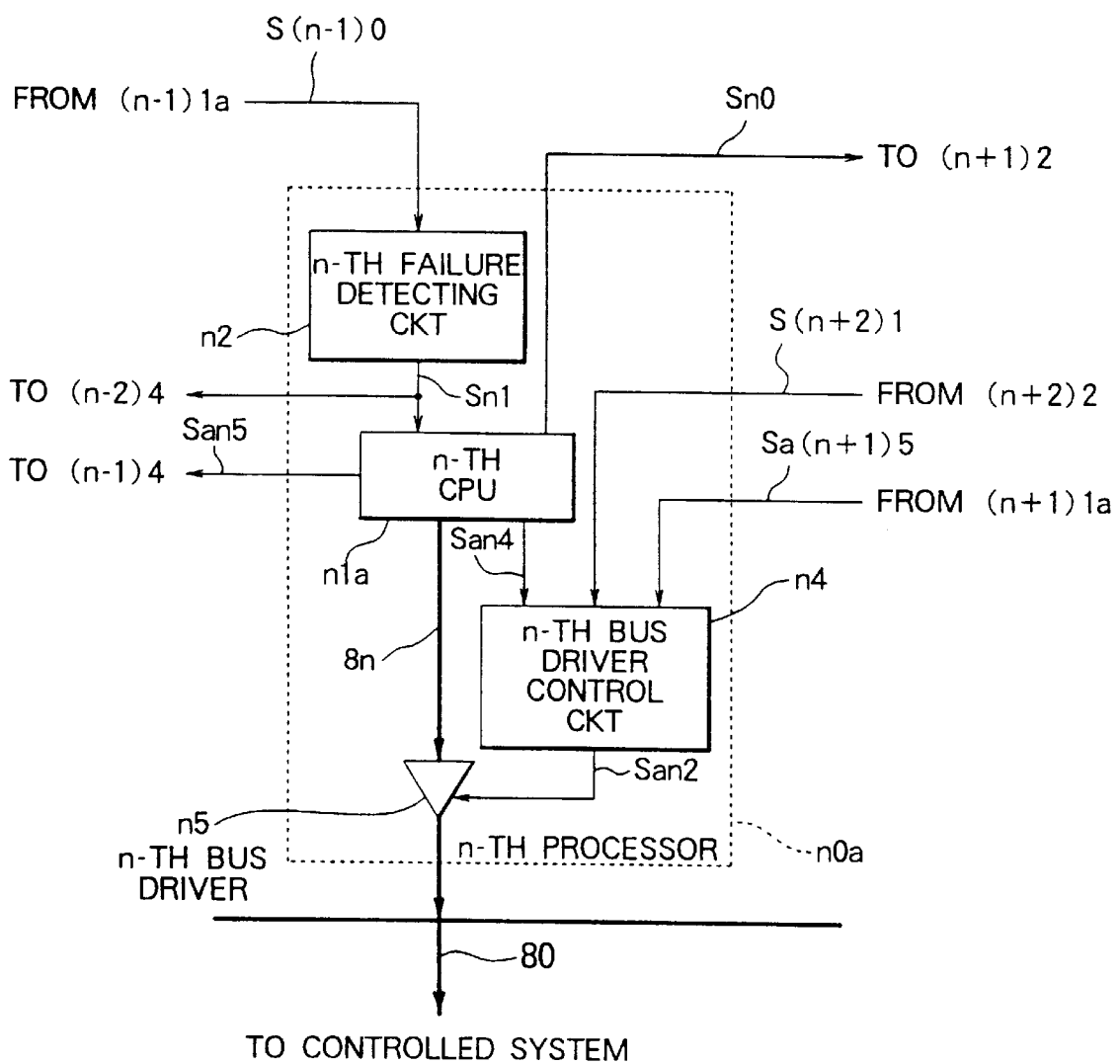
FIG. 7 is a block diagram of a computer system according to a fifth embodiment of this invention.

Referring to FIG. 7, a computer system according to a fifth embodiment of this invention is similar in structure to that illustrated in FIG. 6 except that the computer system comprises first through N-th processors 10a to N0a which are provided with first through N-th internal buses 81 to 8N connected to first through N-th bus drivers 15 to N5, respectively, where N represents a positive integer which is not less than two. In FIG. 7, an n-th processor n0a is illustrated alone for simplification of drawing, where n represents each of 1 through N, both inclusive. The n-th processor n0a is connected to an (n−1)-th processor (n−1)0a, an (n−2)-th processor (n−2)0a, an (n+1)-th processor (n+1)0a, and an (n+2)-th processor (n+2)0a. When n is equal to N, (n+1) turns back to 1. When (n+2) exceeds N, (n+2) turns back to the number obtained by subtracting N from (n+2). When n is equal to 1, (n−1) turns back to N. When (n−2) is less than 1, (n−2) turns back to the number obtained by adding (n−2) and N. The outer bus 80 is coupled to the first through the N-th bus drivers 15 to N5 and to the controlled system (not shown).

The n-th processor n0a comprises an n-th central processing unit (CPU) n1a connected to an n-th internal bus 8n, the (n−1)-th processor (n−1)0a, and the (n+1)-th processor (n+1)0a for managing the whole of the n-th processor n0a, an n-th failure detecting circuit n2 connected to the (n−1)-th processor (n−1)0a and the (n−2)-th processor (n−2)0a for always monitoring an operation state in the (n−1)-th processor (n−1)0a, and an n-th bus driver control circuit n4 connected to the n-th CPU n1a, an n-th bus driver n5, the (n+1)-th processor (n+1)0a, and the (n+2)-th processor (n+2)0a for directing control operation for the n-th bus driver n5.

The n-th CPU n1a periodically supplies the (n+1)-th processor (n+1)0a with an n-th periodic signal Sn0 indicative of the operation state of the n-th CPU n1a. The n-th failure detecting circuit n2 always monitors the operation state of the (n−1)-th processor (n−1)0a by receiving an (n−1)-th periodic signal S(n−1)0 from an (n−1)-th CPU (n−1)1a in the (n−1)-th processor (n−1)0. The n-th failure detecting circuit n2 delivers an n-th monitored result signal Sn1 to the n-th CPU n1a and an (n−2)-th bus driver control circuit (n−2)4 in the (n−2)-th processor (n−2)0.

The n-th CPU n1a supplies the n-th bus driver control circuit n4 with an n-th bus driver control request signal San4 when the n-th CPU n1a requires use for the outer bus 80. The n-th CPU n1a supplies an (n−1)-th bus driver control circuit (n−1)4 of the (n−1)-th processor (n−1)0a with an n-th bus output prohibition signal San5 indicating that bus output by the (n−1)-th processor (n−1)0a is prohibited when the n-th monitored result signal Sn1 indicates that a failure occurs in the (n−1)-th processor (n−1)0a.

The n-th bus driver control circuit n4 receives an (n+2)-th monitored result signal S(n+2)1, the n-th bus driver control request signal San4, and an (n+1)-th bus output prohibition signal S(n+1)5 from an (n+2)-th failure detecting circuit (n+2)2 of the (n+2)-th processor (n+2)0a, the n-th CPU n1a, and an (n+1)-th CPU (n+1)1a of the (n+1)-th processor (n+1)0a, respectively. The n-th bus driver control circuit n4 judges whether or not the outer bus 80 can be used on the basis of the (n+2)-th monitored result signal S(n+2)1 and the (n+1)-th bus output prohibition signal S(n+1)5. Responsive to the n-th bus driver control request signal San4, the n-th bus driver control circuit n4 supplies the n-th bus driver n5 with an n-th bus driver control signal San2 on the basis of the (n+2)-th monitored result signal S(n+2)1 and of the (n+1)-th bus output prohibition signal S(n+1)5.

In general, this invention is applied to a fault-tolerant computer system comprising N processors, where N represents a positive integer which is not less than two, by composing a monitoring processor and a monitored processor in a manner as described hereunder.

Its own processor always monitors an operation state of a first processor which is one of other processors except for its own processor. Its own processor delivers its monitored result to a CPU in its own processor and to a bus driver control circuit in a second processor which the first processor monitors.

The CPU delivers its operation state of its own processor to a failure detecting circuit in a third processor which monitors the operation state of its own processor. When acquisition of a bus is required, the CPU carries out request for the acquisition of the bus to a bus driver control circuit. When the CPU receives a monitoring result signal indicating that there is failure in the operation state of the first processor from the failure detecting circuit, the CPU delivers a bus acquisition prohibition signal indicative of prohibition of bus acquisition by the first processor to a bus driver control circuit in the first processor.

The bus driver control circuit receives an operation state signal indicative of an operation state of the third processor from a failure detecting circuit in a fourth processor which monitors the operation state of the third processor. When the operation state signal indicates that there is failure in the third processor, the bus driver control circuit directs a bus driver to operate control of the bus acquisition on the basis of a bus acquisition request supplied from the third processor in defiance of a signal which is delivered from the third processor and which indicates whether or not its own processor acquires the bus. When the operation state signal indicates that there is no failure in the third processor, the bus driver control circuit directs the bus driver to operate control of the bus acquisition by processing the bus acquisition request supplied from the third processor in accordance with the signal which is delivered from the third processor and which indicates whether or not its own processor acquires the bus.

It will be assumed that the N processors are assigned with processor numbers of 1 through N and its own processor has a processor number of I, where I represents each of 1 through N, both inclusive. In this event, the first, the second, the third, and the fourth processors are assigned with the processor numbers of (I−1), (I−2), (I+1), and (I+2). When an addition result of (I+1) or (I+2) exceeds N, the addition result turns back to 1 following N. When a subtraction result of (I−1) or (I−2) is less than 1, the subtraction result turns back to N following 1. The first processor may be one or more of the second, the third, and the fourth processors. The second processor may be one or more of the first, the third, and the fourth processors. The third processor may be one of more of the first, the second, and the fourth processors. The fourth processor may be one or more of the first, the second, and the third processors.

What is claimed is:

1. A computer system, comprising:

first through N-th processors which are provided with first through N-th input/output information transmission paths, respectively, where N represents a positive integer which is not less than two, where n represents each of integers 1 through N, and where:

when n is equal to N, an (n+1)-th processor corresponds to the first processor and an (n+2)-th processor corresponds to a second processor, when n is equal to N−1, the (n+2)-th processor corresponds to the first processor, when n is equal to 1, an (n−1)-th processor corresponds to the N-th processor and an (n−2)-th processor corresponds to an (N−1)-th processor, and when n is equal to 2, the (n−2)-th processor corresponds to the N-th processor; and an input/output information transmission path control device coupled to the first through the N-th input/output information transmission paths and to a system input/output information transmission path for a controlled system, said input/output information transmission path control device configured to connect the system input/output information transmission path to one of the first through the N-th input/output information transmission paths, wherein an n-th processor comprises:

an n-th central processing unit (CPU) connected to an n-th input/output information transmission path, said (n−1)-th processor, and said (n+1)-th processor, said n-th CPU managing the n-th processor, an n-th failure detecting circuit connected to said (n−1)-th processor and said (n−2)-th processor for monitoring an operation state in said (n−1)-th processor, and an n-th input/output information transmission path acquisition control circuit connected to said n-th CPU, said input/output information transmission path control device, said (n+1)-th processor, and said (n+2)-th processor, for directing a control operation of said input/output information transmission path control devices wherein, when said (n−1)-th processor is determined to be in a failure condition based on said operation state of said (n−1)-th processor as monitored by said n-th failure detecting circuit, said n-th CPU supplies an (n−1)-th input/output information transmission path acquisition control circuit of said (n−1)-th processor with a signal indicating that the acquisition of the system input/output information transmission path by said (n−1)-th processor is prohibited.

2. The computer system as claimed in claim 1, where said n-th input/output information transmission path acquisition control circuit determines whether or not said system input/output information transmission path can be acquired based on an (n+2)-th monitored result signal from an (n+2)-th failure detecting circuit of said (n+2)-th processor and based on an (n+1)-th acquisition prohibition signal from an (n+1)-th CPU of said (n+1)-th processor.

3. A computer system, comprising:

first through N-th processors which are provided with first through N-th input/output channels, respectively, where N represents a positive integer which is not less than two, where n represents each of integers 1 through N, and where:

when n is equal to N, an (n+1)-th processor corresponds to the first processor and an (n+2)-th processor corresponds to a second processor, when n is equal to N−1, the (n+2)-th processor corresponds to the first processor, when n is equal to 1, an (n−1)-th processor corresponds to the N-th processor and an (n−2)-th processor corresponds to an (N−1)-th processor, and when n is equal to 2, the (n−2)-th processor corresponds to the N-th processor; and an input/output control device coupled to the first through the N-th input/output channels and to a system input/output channel for a controlled system, said input/output control device configured to connect the system input/output channel to one of the first through the N-th input/output channels, wherein an n-th processor comprises:

an n-th central processing unit (CPU) connected to an n-th input/output channel, said (n−1)-th processor, and said (n+1)-th processor, said n-th CPU managing the n-th processor, an n-th failure detecting circuit connected to said (n−1)-th processor and said (n-2)-th processor for monitoring an operation state in said (n−1)-th processor, and an n-th input/output channel acquisition control circuit connected to said n-th CPU, said input/output control device, said (n+1)-th processor, and said (n+2)-th processor, for directing a control operation of said input/output control device, wherein, when said (n−1)-th processor is determined to be in a failure condition based on said operation state of said (n−1)-th processor as monitored by said n-th failure detecting circuit, said n-th CPU supplies an (n−1)-th input/output channel acquisition control circuit of said (n−1)-th processor with a signal indicating that the acquisition of the system input/output channel by said (n−1)-th processor is prohibited.

4. The computer system as claimed in claim 3, where said n-th input/output channel acquisition control circuit determines whether or not said system input/output channel can be acquired based on an (n+2)-th monitored result signal from an (n+2)-th failure detecting circuit of said (n+2)-th processor and based on an (n+1)-th acquisition prohibition signal from an (n+1)-th CPU of said (n+1)-th processor.

5. A computer system, comprising:

first and second processors which are provided with first and second input/output channels, respectively; and an input/output control device coupled to the first and the second input/output channels and to a system input/output channel for a controlled system, said input/output control device configured to connect the system input/output channel to one of the first and the second input/output channels, said first processor comprising a first central processing unit (CPU) connected to the first input/output channel, said first CPU managing the first processor, a first failure detecting circuit connected to said second processor for monitoring an operation state in said second processor, and a first input/output channel acquisition control circuit connected to said first CPU, said first failure detecting circuit, said input/output control device, and said second processor for directing a control operation of said input/output control device, said second processor comprising a second CPU connected to the second input/output channel, said second CPU managing the second processor, a second failure detecting circuit connected to said first processor for monitoring an operation state in said first processor, and a second input/output channel acquisition control circuit connected to said second CPU, said second failure detecting circuit, said input/output control device, and said first processor for directing said control operation of said input/output control device, wherein, when said first processor is determined to be in a failure condition based on said operation state of said first processor as monitored by said second failure detecting circuit at a same time said second processor is in a normal operation state, said second failure detecting circuit notifies said second CPU and said second input/output channel acquisition control circuit of said failure condition of said first processor to cause said second CPU to direct said control operation of said input/output control device and to issue a first channel acquisition prohibition signal to said first input/output channel acquisition circuit, irrespective as to whether said first CPU has issued a second channel acquisition prohibition signal to said second input/output channel acquisition circuit, and wherein, at a same time, said first failure detecting circuit monitors an operation state of said second processor and outputs a result of the monitored operation state to said first input/output channel acquisition circuit, and when said second processor is determined to be in said normal operation state and when said first input/output channel acquisition circuit receives said first channel acquisition prohibition signal, said first input/output channel acquisition circuit does not allow said first CPU to direct the control operation of said input/output control device even when commanded to do so by said first CPU.

6. A computer system, comprising:

first through N-th processors which are provided with first through N-th internal buses connected to first through N-th bus drivers, respectively, where N represents a positive integer which is not less than two, where n represents each of integers 1 through N, and where:

when n is equal to N, an (n+1)-th processor corresponds to the first processor and an (n+2)-th processor corresponds to a second processor, when n is equal to N−1, the (n+2)-th processor corresponds to the first processor, when n is equal to 1, an (n−1)-th processor corresponds to the N-th processor and an (n-2)-th processor corresponds to an (N−1)-th processor, and when n is equal to 2, the (n−2)-th processor corresponds to the N-th processor; and an outer bus coupled to the first through the N-th bus drivers and to a system input/output channel for a controlled system, an n-th processor comprises:

an n-th central processing unit (CPU) connected to an n-th internal bus, the (n−1)-th processor, and the (n+1)-th processor, said n-th CPU managing the n-th processor, an n-th failure detecting circuit connected to said (n−1)-th processor and said (n−2)-th processor for monitoring an operation state in said (n−1)-th processor, and an n-th bus driver control circuit connected to said n-th CPU, an n-th bus driver, said (n+1)-th processor, and said (n+2)-th processor for directing a control operation of the n-th bus driver, wherein, when said (n−1)-th processor is determined to be in a failure condition based on said operation state of said (n−1)-th processor as monitored by said n-th failure detecting circuit, said n-th CPU supplies an (n−1)-th bus driver control circuit of said (n−1)-th processor with a signal indicating that output of said (n−1)-th processor to said outer bus is prohibited.

7. The computer system as claimed in claim 6, where said n-th bus driver control circuit determines whether or not said outer bus can be used based on an (n+2)-th monitored result signal from a (n+2)-th failure detecting circuit of said (n+2)-th processor and based on an (n+1)-th bus output prohibition signal from an (n+1)-th CPU of said (n+1)-th processor.

* * * * *